Nov. 4, 1952          J. W. PRINGLE          2,616,273
                      FLEXIBLE COUPLING
Filed Dec. 28, 1946                    2 SHEETS—SHEET 1
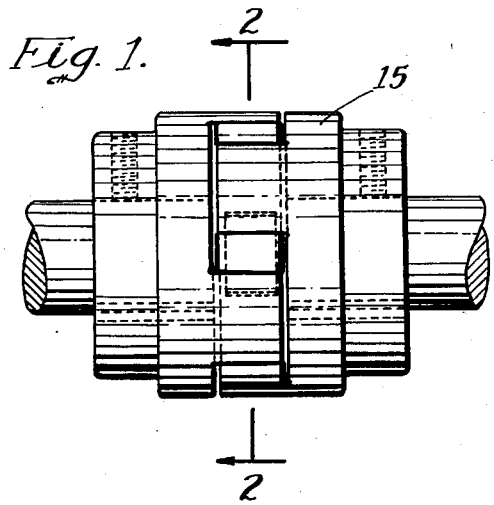
Fig. 1.
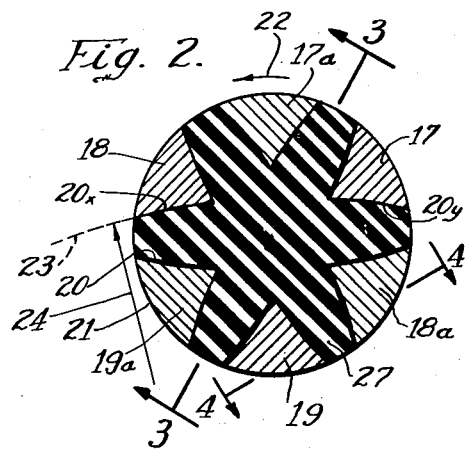
Fig. 2.
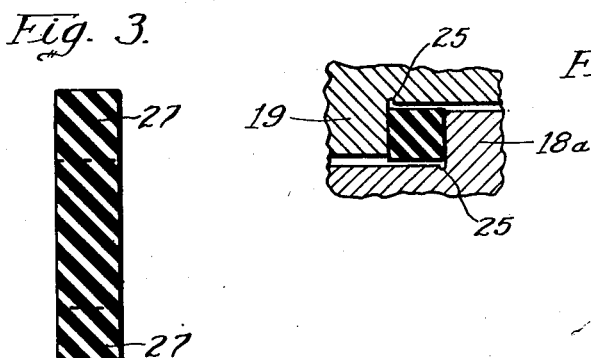
Fig. 3.   Fig. 4.
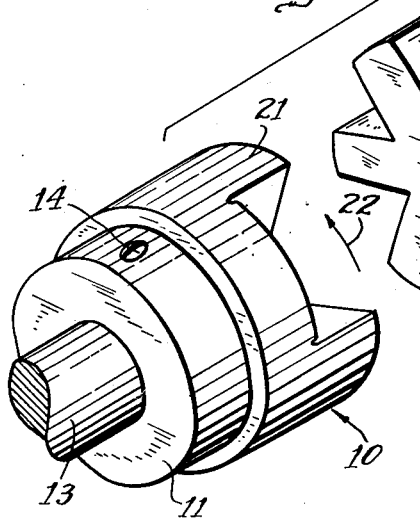
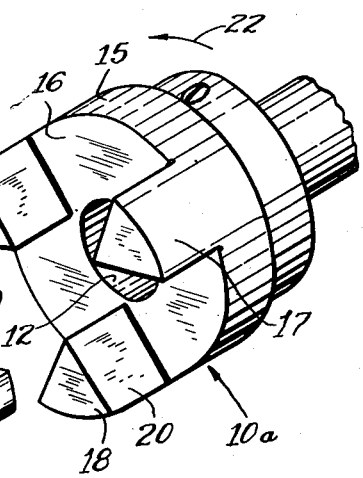
Fig. 5.
INVENTOR.
John W. Pringle,
BY
Watson D. Harbaugh
Atty.

Nov. 4, 1952 J. W. PRINGLE 2,616,273
FLEXIBLE COUPLING
Filed Dec. 28, 1946 2 SHEETS—SHEET 2
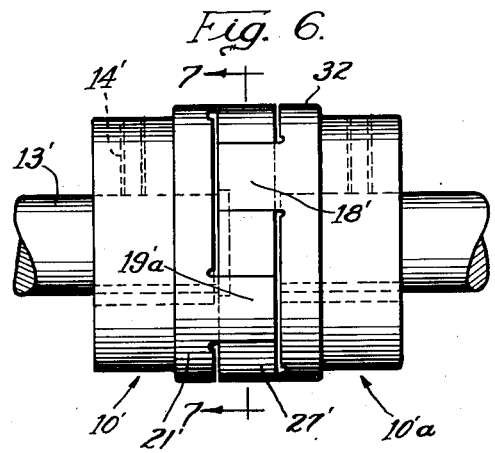
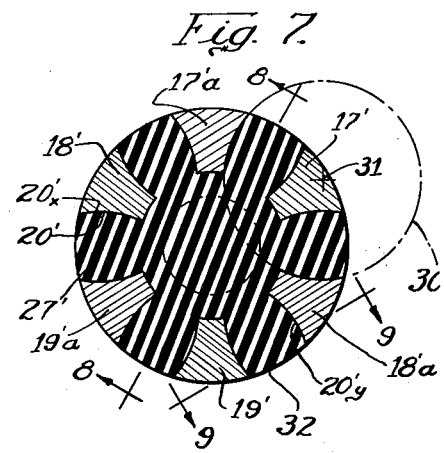
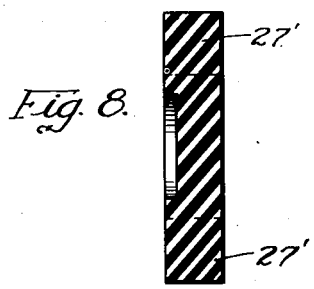
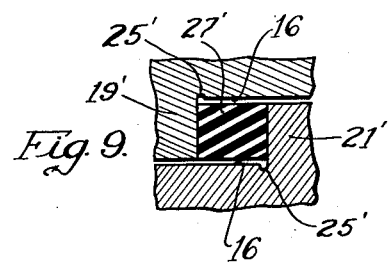
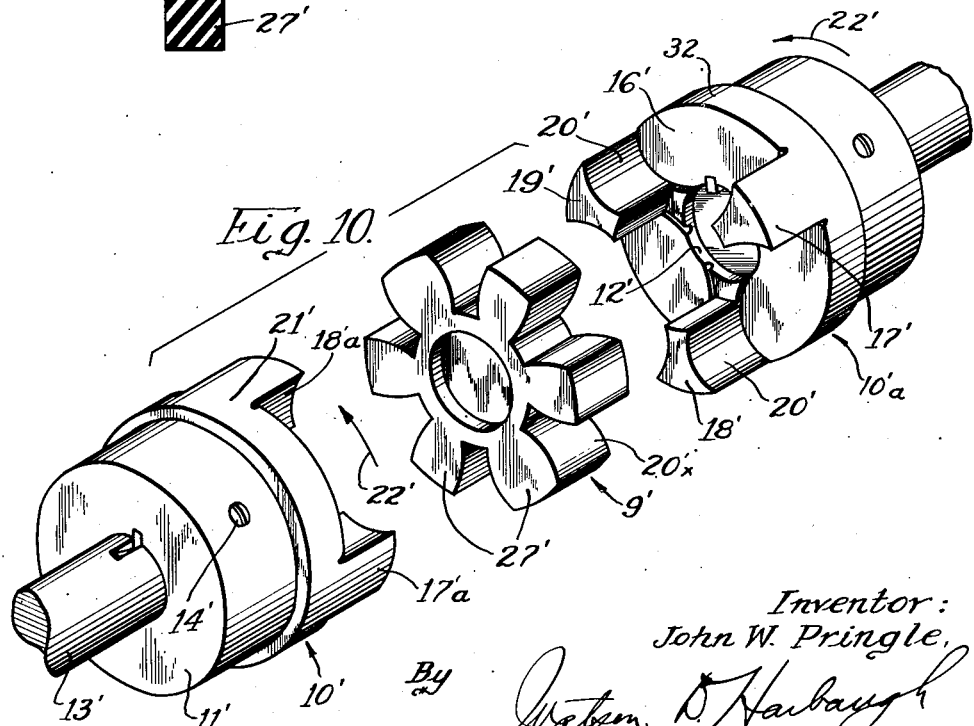
Inventor:
John W. Pringle,
By
Atty.

Patented Nov. 4, 1952

2,616,273

UNITED STATES PATENT OFFICE 2,616,273

FLEXIBLE COUPLING

John W. Pringle, Northbrook, Ill., assignor to Everett L. Stevens, Woodstock, Ill.

Application December 28, 1946, Serial No. 719,066

7 Claims. (Cl. 64—14)

The invention relates to couplings generally, and more particularly to devices for connecting two substantially aligned shafts disposed end to end in interdrive relationship which allows for minor misalignments and a slight angularity between the axes of the shafts.

Many couplings have been devised heretofore for connecting shafts in driven relationship, the simplest form of which utilizes two members carried by the shafts with lugs on the members alternately interdigitated with each other and separated by radiating arms of a molded rubber spider, through which arms the torque between the shafts is transmitted by the lugs.

During rotation of the shafts the centrifugal action upon the spider arms tends to elongate them, stretching the rubber at the expense of a drive support and setting up unexpected wear spots and vibration or pulsations. Efforts have been made to counteract this centrifugation of the arms by additional elements such as enclosure rings but none of the devices utilize the centrifugal action to an advantage.

One of the objects of the present invention is to provide a coupling arrangement of the class described in which the centrifugal action upon the resilient spider arms tends to increase the driving pressure and the effective radial leverage effort between the adjacent lugs which act compressively upon the arms.

A further feature of the invention resides in the construction and relationship of the parts whereby at normal loads and running speeds the centrifugal effort upon the arms subject to compression opposes very substantially the compressive effort of the torque transmitted, and does so without appreciably displacing the center of the arm mass which is subjected to the two opposing forces, even though the effective leverage effort is increased.

Another object of the invention is to provide a coupling which does not appreciably expand the lug supporting members away from each other in an axial direction, i. e., in a direction exerting end thrust upon the shafts.

The invention is also characterized by a spider arm construction which is circumferentially narrower near its outside end than at its base and the arm engaging faces of the lugs are concave to provide a cradling action for the arms.

A further object of the invention is found in the degree of concavity of and the angle at which the lug faces engaging the spider arms are disposed.

The invention without increase of conventional size for this type of coupling also accomplishes improved results over larger couplings employing external bands to keep the spider arm mass from being squeezed radially outwardly under the forces of compression and centrifugation.

A further object of the invention is to provide an improved spider form in which the arms thereof are urged to wedge and hold themselves in solid engagement between driving lugs to decrease friction between the faces and to pick up and carry the torque load imposed without appreciable shifting between the lugs.

A companion object to the preceding object is to utilize the centrifugal wedging action to maintain an appreciably snug contact between a spider arm and the trailing faces of the driving lugs so that pulsation between the shafts normally experienced with conventional couplings due to gaps is greatly reduced, in fact is virtually eliminated.

Another object of the invention is the provision of a lug form on the coupling members which may be cut on a lathe by a circular end cutter developing a surface of revolution whose radius is approximately double the diameter of the coupling member or preferably whose center is near the circumference of the coupling member.

A further object of the invention is to provide a coupling which is quickly and simply made and easy to install, inspect and service.

These being among the objects of the invention, other and further objects will appear from a study of the drawings, the description relating thereto and the appended claims.

Several embodiments of the invention are shown in the two sheets of drawings wherein:

Fig. 1 is a side elevation of one form of the invention as installed ready for use to interdrive two shafts.

Fig. 2 is a section taken on line 2—2 of Fig. 1.

Fig. 3 is a section taken on line 3—3 of Fig. 2.

Fig. 4 is a section taken on line 4—4 of Fig. 2 illustrating a modification which may be incorporated in the embodiment shown in Fig. 1.

Fig. 5 is an exploded perspective view of the coupling with the parts in spaced relationship in their order of assembly when the two coupling members are to be brought axially together in drive relationship.

Fig. 6 is a side elevation of a preferred form of the invention as installed ready for use to interdrive two shafts.

Fig. 7 is a section taken on line 7—7 of Fig. 6.

Fig. 8 is a section taken on line 8—8 of Fig. 6.

Fig. 9 is a section taken on line 9—9 of Fig. 6.

Fig. 10 is an exploded view similar to Fig. 5 of the working parts shown in Fig. 6.

In the present invention a single resilient spider is employed whose radiating arms, preferably six in number, are shaped convexly on opposite faces to be received and cradled between correspondingly shaped opposing faces of cooperating lugs carried by two identical members for interdriving two shafts. The faces are semicylindrical in contour and the opposite faces on each arm are disposed to converge at a point outside the periphery of the coupling so that the faces of the lugs mating therewith operate to cradle the body mass of the spider arms under torque transmitting compression in a way whereby centrifugal displacement action at expected speeds counteracts compressive displacement action under expected loads. Due to the two possible shapes shown and described this is accomplished without cutting the spider at the inner corners of the arm and without permitting radial bodily displacement of the arms near their outer corners.

The lug faces on each member are cut in pairs by a circular tool with the result that each pair of faces are part of the same cylindrical contour. In one embodiment the cylindrical contour includes remote faces on two adjacent lugs while in another embodiment, the preferred one, the cylindrical contour includes two adjacent faces of adjacent lugs.

More particularly, the shaft coupling comprises a spider 9 and a pair of identical coupling members 10 and 10a made preferably of metal castings. Each member has a hub 11 bored as at 12 to receive substantially aligned shafts 13 to which they can be locked by setscrews 14 with or without cooperating keyways. A radial flange 15, preferably formed integrally with each of the hubs, is provided upon its front face 16 with lugs 17, 18 and 19 numbered sequentially for a better understanding of the invention as hereinafter described. These lugs are generally triangular in sectional contour, defining concave sides 20 of equal length and area and a convex side 21 coincident with the circumference of the flange 15.

Considering the elements as rotating in the direction of the arrows 22, the leading face 20x of lug 19 and the trailing face 20y of lug 17 lie in the same surface of revolution 23 for convenience in machining. The radius of that surface of revolution is approximately twice the diameter of the flange 15.

This is true of all the other faces in like spaced relation and the radius of surface of revolution determined upon is such that the faces incline at the correct angle for a coupling expected to carry a certain speed and load. This radius is increased slightly for low speed high torque applications and decreased slightly for high speed and low torque applications. Equivalent effects within certain limits can also be obtained by standardizing upon a particular radius and varying the diameter of the flange, provided of course that the driving area of the lugs is not reduced below the minimum required to preserve the resiliency of the spider above the point of breaking down the body structure of the spider at an expected load.

Where the faces 20 meet the end faces 16 of the flange 15, they are preferably grooved with a rounded contour as indicated at 25 to provide a surface for squarely engaging the faces on the arms of the spider over their fully exposed expanse to eliminate any possible axial end thrust developing at the corners.

The spider 9 comprises a single resilient cushion member for transmitting power between the two members 10 and 10a by means of six integral identical arms 27 which dovetail with and fit snugly between alternating lugs 17, 17a, 18, 19a, 19 and 18a (Fig. 2) of the coupling members. The coupling members 10 and 10a are locked by the setscrews on the shafts with sufficient space between the end faces of the spider and the opposing faces of the members that they, when tested while stationary, will barely contact in an axial direction under application of the maximum rated torque load for the system.

As part of this test condition and by way of explaining the preferred structural characteristics of the spider for the conditions noted, the spider is made of a molded elastomer preferably having a Durometer A hardness of 75 to 80 as an index of its modulus of elasticity. The construction and arrangement of bearing faces and body masses is shown in scale for a coupling having a working diameter of from 2 to 3 inches to be operated at motor speeds of approximately 1750 R. P. M.

Three alternate spider arms 27 of the six provided bear the principal torque load while the other three arms run idle of the principal torque load. However, these three idle arms operate to absorb backlash and pulsation present in the interdrive. In operation, the three idle spider arms are mainly subjected to the influence of centrifugal force under which they tend to move outwardly appreciably to occupy any expansion occurring in the spaces or pockets in which they are disposed which results from effective load compression of the three working arms in which their pockets are correspondingly reduced.

Although the improved operation and longer life of couplings constructed according to applicant's invention cannot be fully explained it would appear that these two forces of centrifugation and compression, both of which are objectionable in conventional couplings are utilized beneficially by the invention in that they are so handled that they oppose or cancel out each other and do so in a way improving the drive. This is important because couplings of the class described have come to be relied upon for cushioning pulsating loads as well as accommodating minor misalignments of the shafting.

The centrifugal action bolsters the loaded spider arms against the compressive effect of the torque action. As centrifugal force tends to move the body mass of these arms outwardly, there results a wedging or counter-compressive action opposing the compressive action of the torque drive. This wedging action not only tightens the shafts against pulsations developing at the coupling but even upon the idle arms operates to steady the elements against a hammering of the working arms under a pulsating load. Dampening of this hammering effect upon the load carrying arms reduces their internal heat and surface friction and materially increases the life of the coupling. Not only this but the effective modulus of elasticity is decreased with increased speeds in a direction favorable to the expected working conditions since there is less pulsation and torque experienced at higher speeds than encountered at low shaft speeds. The decreased effective elasticity more nearly rigidifies the interdrive at high speeds because both the idle and the working arms are involved in a greater wedging action and tend to oppose each other in a way functioning to clamp the lugs between less resilient elements.

At low speeds and higher torques the opposing faces of cooperating lugs become more effective as concave pockets in which the essential and high compressive action upon the body mass is not to flatten it but rather to condense or huddle it, the peripheral edges of the faces contacting the arms being directed convergingly towards each other at an external point in radial line which passes through the center of the arm mass. This arrangement helps the correspondingly shaped arm masses to carry the load without a shearing action that is generally experienced in conventional couplings.

In Figs. 6 to 10 a preferred form of invention is shown in which the curves of the faces are portions of more sharply curved cylindrical surfaces 30 whose axes 31 are located proximate to or within the circumference 32 of the coupling, all the other features already described being substantially the same, like numbers with prime characters added referring to like parts throughout the views. The preferred form has an augmented huddling action very desirable where overloads are expected or experienced.

It has been proposed heretofore in the art to locate rubber balls between opposing cup-shaped surfaces, but in those instances the theoretical point contact between the ball surface and the associated surfaces merely flattens the ball and thereby concentrates the resulting hysteresis to the sides of the ball with many unwelcome difficulties arising such as splitting the wall of the ball and accelerating its breakdown. In the embodiment under consideration all the advantages described in connection with the other embodiment of the invention have been preserved and none of the difficulties experienced with rubber balls has been incurred.

The snug mating curved faces which converge inwardly and outwardly for the arms 27' of the spiders 9' operate to augment the huddling action of the opposing working faces 20' over that of faces 20 under heavy compresssion. The outer portions of the faces 20' huddle the body mass of the arms 27' inwardly under compression to oppose and be assisted by counter-centrifugal action due to speed to provide the drive leverage in the system. This is of particular significance due to trends in coupling usages in the direction of higher speeds and possibly heavier torque loads.

Under such circumstances, although the huddling action is more pronounced with the spider 9' than with the spider 9 because of the steeper inclination of face convergence increasing opposition to centrifugation of the arms, the drive leverage action is more favorable with the spider 9 as will be more particularly described a little later. In both embodiments, however, the incline of convergence is such that the effective center of resiliency of the body mass of the arms 27' is as far as possible from the axis of coupling rotation without being lost to the compressive huddling action under centrifugal forces. This center would normally be in the center of the arm mass and moves outwardly from an effect viewpoint to the plane where the radii of the two faces on each arm coincide, which point is still safely within the convergence huddle.

This huddling action is brought to its fullest effect without placing any axial end thrust upon the shafts which would cause wear on shaft bearings (not shown). If a heavy load were to be imposed upon the two lugs and arm shown in Fig. 9, the initial compression would be axial without contacting both surfaces 16 to exert end thrust. This compressive displacement of the body mass of the three loaded arms would permit the outer converging faces of cooperating lugs as shown in Fig. 7 to approach each other and reduce their peripheral spacing to crowd the body mass radially inwardly as well as axially, the two actions taking place simultaneously so that the effective drive radius of the coupling becomes a counterpart of the huddling action as related to the effective center of the arm mass under the influence of load compression and speed centrifugation.

Before discussing the effective drive radius leverage of the coupling it should be noted that the location of the axis 31 of the cylindrical surfaces 20' theoretically with respect to the periphery of the coupling also determines how much huddling is effected. The further inside the periphery this axis is located, the greater the huddling action upon the arm mass and the shorter the effective driving radius. By locating the axis near or at the periphery, the closer it is to the effective drive radius of the system when centrifugal force is acting upon the system. Thus if heavy loads at low speeds are expected, the axis 31 can be located at the periphery of the coupling. The optimum is shown in the drawings in proportion to a two-inch coupling.

The effective point of leverage drive or drive radius has been mentioned. Under resting conditions this point can only be the average center of all forces and counterforces present in the system of resilient mass, face angles, compression and centrifugal force. It, however, shifts with any changes in any one or all of these factors and shifts radially under centrifugal force changes. With increase in speed the shift is outwardly because the tendency of the body mass is to shift outwardly against the counteraction of the huddling effect of cooperating faces. Increased speeds tend to render the outer end of the spider arm more dense and rigid than before and thereby effects a substantial displacement outwardly of the point of effective drive leverage between the lugs and spider arms. There is little or no danger of damage to the spider with this shift because the huddling action blocks any excessive bodily movement of the arm mass.

Because of this favorable shift in point of drive leverage under centrifugal action, a coupling designed to carry overloads can withstand high speeds and couplings designed for high speeds can withstand overloads. In view of this, the invention is very flexible to its environment in operation and is usable where load is high and space for a coupling is limited, it being presumed that it is a recognized fact in the industry that the greater the driving radius the easier is the load at that point if the torque on the shaft is constant.

The relative shift of the point of drive leverage can also be provided for in the elasticity of the spider since the shift would be greater for more elastic elastomer than it is for harder elastomers. Between elasticity of the spider and the location of the axis 31, it being deeper for softer materials than for hard materials, it is possible to stock rough castings and machine them specially for each application, considering the spider material to be used, merely by changing the cutter limits. On the other hand, standard shapes of spiders as shown can be used because the corresponding difference in shape of spider for such changes in lug form is slight.

In this connection, the circles 23 and 30 illustrated can be taken as the cutting perimeter of rotary cutting tools which with the embodiment shown in Fig. 1 can be fed axially into the coupling member, or, in Fig. 6, it can be fed either axially or radially. If radially, the corner grooves 25 are omitted. However, the face of each coupling member can be cut clean in either form if desired in the one cut.

The center portion of the spider serves either as a gauge for checking the end spacing between the shafts as assisted by a ring 40 embedded in the center of spider 9 or by a spider recessed as at 41 as shown in spider 9a (Fig. 8) if extra clearance is desired.

Having thus described the invention it will be readily apparent to those skilled in the art that various modifications and changes can be made without departing from the spirit of the invention, the scope of which is commensurate with the appended claims.

What is claimed is:

1. The combination in a coupling of the class described of a pair of coupling members having circumferentially spaced lugs extending axially from their adjacent end faces into alternatively overlapping relationship with one another and an interdriving spider interposed between said faces and having radiating arms disposed between and in mating contact with opposing faces of adjacent lugs, said opposing faces converging outwardly and defining cylindrical surfaces, the adjacent faces of adjacent lugs on each member being a portion of the same cylindrical surface of revolution.

2. A power transmitting coupling spider of the class described made of an elastomer and having six radiating arms, the opposite working faces of adjacent arms defining a single surface of revolution.

3. A power transmitting coupling spider of the class described made of an elastomer and having six radiating arms, the opposite working faces of adjacent arms defining a surface of revolution whose center is outside of and between such adjacent arms and is proximate to the perimeter of the spider.

4. A power transmitting coupling spider of the class described made of an elastomer and having a plurality of radiating arms whose perimeter defines a closed regular surface with the center thereof approximately coincident with the axis of rotation of the spider, each of the working faces of each arm being convex and defining a portion of a cylindrical surface in common with a cylindrical surface defined by one of the working faces of one of the other arms, there being as many cylindrical surfaces defined as there are arms, and said cylindrical surfaces intersecting one with another, the outermost lines of intersection being disposed outside of said perimeter defining a closed regular surface.

5. The combination in a coupling of the class described of a pair of coupling members having circumferentially spaced lugs extending axially from their adjacent end faces into alternatively overlapping relationship with one another and an interdriving spider made of an elastomer interposed between said faces and having radiating arms disposed between and in mating contact with opposing faces of adjacent lugs said opposing faces converging outwardly and defining surfaces of revolution, each surface of revolution including concave remote faces of adjacent lugs on each member.

6. A coupling member of the class described adapted to be secured to a shaft in rotary drive relationship and including circumferentially spaced lugs extending axially from an end face thereof, said lugs having concave faces forming portions of surfaces of revolution, the adjacent faces of adjacent lugs being a portion of the same surface of revolution.

7. A coupling member of the class described adapted to be secured to a shaft in rotary drive relationship and including circumferentially spaced lugs extending axially from an end face thereof, each of said lugs having generally radially disposed concave faces which diverge outwardly and inwardly along surfaces of revolution each surface of revolution including remote faces of adjacent lugs.

JOHN W. PRINGLE.

REFERENCES CITED

The following references are of record in the file of this patent:

UNITED STATES PATENTS

| Number | Name | Date |
|---|---|---|
| 1,791,763 | Peters | Feb. 10, 1931 |
| 2,022,626 | Weis | Nov. 26, 1935 |
| 2,135,634 | Byrom | Nov. 8, 1938 |
| 2,301,660 | Ricefield | Nov. 10, 1942 |